(12) United States Patent
Wang et al.

(10) Patent No.: US 10,536,257 B2
(45) Date of Patent: *Jan. 14, 2020

(54) SIGNAL PRESENCE DETECTION CIRCUIT AND METHOD

(71) Applicant: Marvell World Trade Ltd., St. Michael (BB)

(72) Inventors: Lu Wang, Framingham, MA (US); Scott E. Meninger, Groton, MA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,822

(22) Filed: Feb. 21, 2019

(65) Prior Publication Data

US 2019/0182022 A1   Jun. 13, 2019

Related U.S. Application Data

(63) Continuation of application No. 15/497,356, filed on Apr. 26, 2017, now Pat. No. 10,263,759.

(51) Int. Cl.
*H04L 5/22* (2006.01)
*H04L 25/02* (2006.01)

(52) U.S. Cl.
CPC .............. *H04L 5/22* (2013.01); *H04L 25/02* (2013.01)

(58) Field of Classification Search
CPC ... H04L 1/20; H04L 25/0274; H04L 25/0296; H04L 25/085; H04L 5/22; H04L 25/02; H04L 25/0272

See application file for complete search history.

(56) References Cited

U.S. PATENT DOCUMENTS

| | | | |
|---|---|---|---|
| 4,290,146 A | 9/1981 | Adolfsson et al. |
| 6,799,131 B1 | 9/2004 | Steiner et al. |
| 6,831,521 B1 | 12/2004 | Abidin et al. |
| 7,102,392 B2 | 9/2006 | Hsu et al. |
| 9,698,808 B1 | 7/2017 | Meninger et al. |
| 10,263,759 B2 | 4/2019 | Wang et al. |
| 2004/0166821 A1 | 8/2004 | Varra et al. |
| 2007/0271054 A1 | 11/2007 | Chen et al. |

OTHER PUBLICATIONS

Sanad Kawar et al., "A 10 Gbps differential low-power loss of signal detector for AC-coupled serial transceivers in 28 nm CMOS technology," Microelectronics Journal, vol. 56, Issue C, pp. 65-73, Oct. 2016.

*Primary Examiner* — Vineeta S Panwalkar
(74) *Attorney, Agent, or Firm* — Hamilton, Brook, Smith & Reynolds, P.C.

(57) ABSTRACT

In some embodiments, the circuits (and methods) may include a reference generator configured to generate a reference signal. The circuits (and methods) may also include a signal presence detection module configured to perform calibration on itself, during a calibration phase, based upon the reference signal. The signal presence detection module may be further configured to receive an input signal. The signal presence detection module may be further configured to perform detection, during a signal amplitude detection phase, of a state of the input signal. According to some embodiments, the circuits (and methods) may include a peak detector of the signal presence detection module shared by the calibration and the detection. In some embodiments of the circuits (and methods), the reference generator may be unpowered during the signal amplitude detection phase. The calibration and the detection may share the peak detector based upon time division multiplexing.

20 Claims, 9 Drawing Sheets

SIGNAL PRESENCE DETECTION CIRCUIT AND METHOD

RELATED APPLICATION(S)

This application is a continuation of U.S. application Ser. No. 15/497,356, filed Apr. 26, 2017. The entire teachings of the above application are incorporated herein by reference.

BACKGROUND

Electrical idle detection and loss of signal (LOS) detection are common features in many high-speed serial interface protocols, such as the peripheral component interconnect express (PCIe) and serial advanced technology attachment (SATA) standards. These features are essential to the low-power high-speed serial interface designs because modern receivers use clock and data recovery (CDR) circuits and equalizers to process the received signals. In addition, it is important to know if there is valid signal presence in a link.

SUMMARY

With the help of a signal presence detector, the receiver may be powered down when there is no signal from the transmitter to reduce the power consumption, and during a sudden loss of the link the receiver may freeze the state of its CDR and equalizers to prevent increased bit error rate (BER). As such, the present disclosure is directed to circuits and methods that detect signal presence, including but not limited to detection of electrical idle (also known as "idle" herein) and loss of signal (LOS).

In some embodiments, the circuits (and methods) may include a reference generator configured to generate a reference signal. The circuits (and methods) may also include a signal presence detection module (and/or signal presence detection circuit herein) configured to perform calibration on itself, during a calibration phase, based upon the reference signal. The signal presence detection module (and/or signal presence detection circuit herein) may be further configured to receive an input signal. The signal presence detection module may be further configured to perform detection, during a signal amplitude detection phase, of a state of the input signal. According to some embodiments, the circuits (and methods) may include a peak detector of the signal presence detection module shared by the calibration and the detection.

In some embodiments of the circuits (and methods), the reference generator may be unpowered during the signal amplitude detection phase. The calibration and the detection may share the peak detector based upon time division multiplexing. The peak detector may amplify the reference signal and the input signal based upon a gain ("gain" understood herein to include but not be limited to including voltage gain, voltage amplitude gain, current gain, and/or any other gain known to one skilled in the art). The reference signal may include at least one of: a direct-current (DC) value, a clock pattern, and a pseudo-random binary sequence (PRBS) pattern. The reference signal and the input signal may be differential signals (i.e., the reference signal may comprise a differential pair of signals and the input signal may comprise a differential pair of signals).

According to some embodiments of the circuits (and methods), the signal presence detection module may include a multiplexer configured to select and forward to a multiplexer output the reference signal or the input signal. The peak detector may be configured to detect at least one peak voltage associated with multiplexer output and generate at least one peak detector output indicating at least one peak voltage based upon the detected at least one peak voltage. The signal presence detection module may include a comparator configured to perform a comparison associated with the at least one peak detector output. The comparator may be further configured to generate a signal unavailability indication of at least one of idle and loss-of-signal based upon the state of the input signal.

According to some embodiments of the circuits (and methods), the peak detector may be further configured to amplify the multiplexer output based upon a gain. The peak detector may be further configured to generate the at least one peak detector output based upon the amplified multiplexer output.

The signal presence detection module may include an output adjuster (i.e., output adjuster circuit) configured to adjust the at least one peak detector output. The output adjuster may adjust the at least one peak detector output based upon the signal unavailability indication (i.e., idle and/or LOS). The output adjuster may include a digital controller configured to receive the signal unavailability indication and generate a control value. The output adjuster may include a digital-to-analog (DAC) converter configured to adjust the peak detector output based upon the control value. The digital-to-analog (DAC) converter may be further configured to perform sourcing and/or sinking of a current between first and second differential outputs (i.e., positive and negative differential outputs) of the at least one peak detector output. The peak detector may be further configured to provide a common mode voltage associated with the first and second differential outputs (i.e., positive and negative differential outputs).

In some embodiments, the methods (and circuits) may generate a reference signal based upon a reference generator. In some embodiments, the methods (and circuits) may calibrate, during a calibration phase, a signal presence detection module based upon the reference signal. In some embodiments, the methods (and circuits) may receive, at a signal presence detection module, an input signal. In some embodiments, the methods (and circuits) may detect, during a signal amplitude detection phase, a state of the input signal based upon the signal presence detection module. The calibrating and the detecting may share a peak detector of the signal presence detection module.

According to some embodiments of the methods (and circuits), the reference generator may be unpowered during the signal amplitude detection phase. The calibrating and the detecting may share the peak detector based upon time division multiplexing. The peak detector may amplify the reference signal and the input signal based upon a gain. The reference signal may include at least one of: a direct-current (DC) value, a clock pattern, and a pseudo-random binary sequence (PRBS) pattern. The reference signal and the input signal may be differential signals.

According to some embodiments of the methods (and circuits), the signal presence detection module may select and forward to a multiplexer output the reference signal or the input signal. The signal presence detection module may detect, by the peak detector, at least one peak voltage associated with multiplexer output. The signal presence detection module may generate, by the peak detector, at least one peak detector output indicating at least one peak voltage based upon the detected at least one peak voltage. The signal presence detection module may perform, by a comparator, a comparison associated with the at least one peak detector output. The signal presence detection module may generate, by the comparator, a signal unavailability indication of at least one of idle and loss-of-signal based upon the state of the input signal.

According to some embodiments, the methods (and circuits) may amplify, by the peak detector, the multiplexer output based upon a gain, further generating the at least one peak detector output based upon the amplified multiplexer output. The signal presence detection module may include an output adjuster (i.e., output adjuster circuit) configured to adjust the at least one peak detector output. The output adjuster may adjust the at least one peak detector output based upon the signal unavailability indication (i.e., idle and/or LOS).

According to some embodiments, the methods (and circuits) may, by a digital controller of the output adjuster, receive the signal unavailability indication and generate a control value. According to some embodiments, the methods (and circuits) may, by a digital-to-analog (DAC) converter of the output adjuster, adjust the peak detector output based upon the control value. The digital-to-analog (DAC) converter may source or sink a current between first and second differential outputs of the at least one peak detector output. The peak detector may provide a common mode voltage associated with the first and second differential outputs (i.e., positive and negative differential outputs).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 also illustrates the circuitry within an output adjustment block, according to some embodiments of the present disclosure.

DETAILED DESCRIPTION

A description of example embodiments of the invention follows.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

Figure 1A:
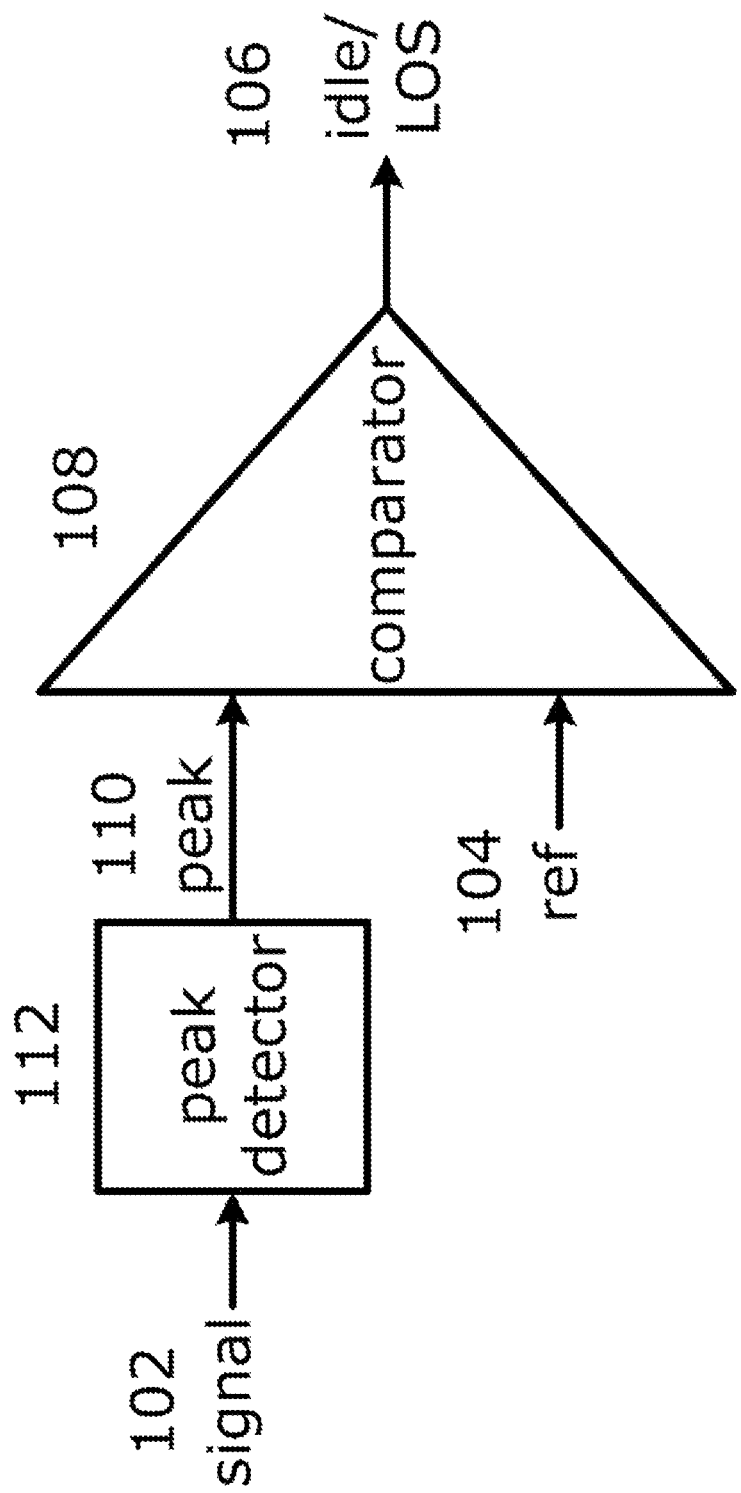
FIGS. 1A-B illustrate existing circuits that detect presence of signals.
Figure 1B:
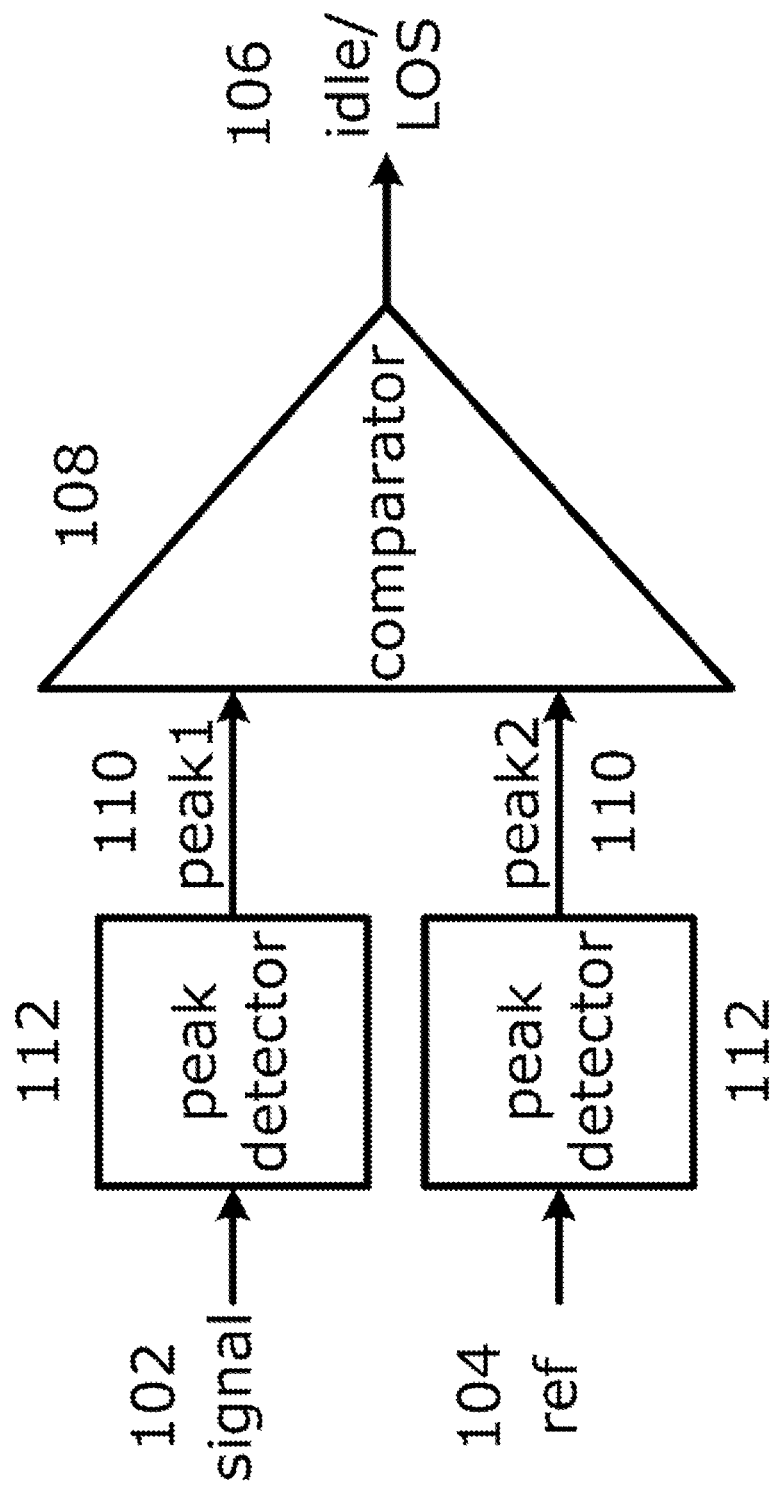

As illustrated in FIGS. 1A-B, in order to perform signal presence detection, existing circuits may receive an input signal 102 and a reference signal 104 and provide an output 106 indicating a state of idle (and/or LOS) 106. As also illustrated in FIGS. 1A-B, existing circuits may detect the state of idle (and/or LOS) 106 based a comparison 108 between either: (1) a reference signal 104 and the output 110 of a peak detector 112 (as shown in FIG. 1A), or (2) the outputs 110 of two peak detectors 112 (as shown in FIG. 1B).

Figure 1C:
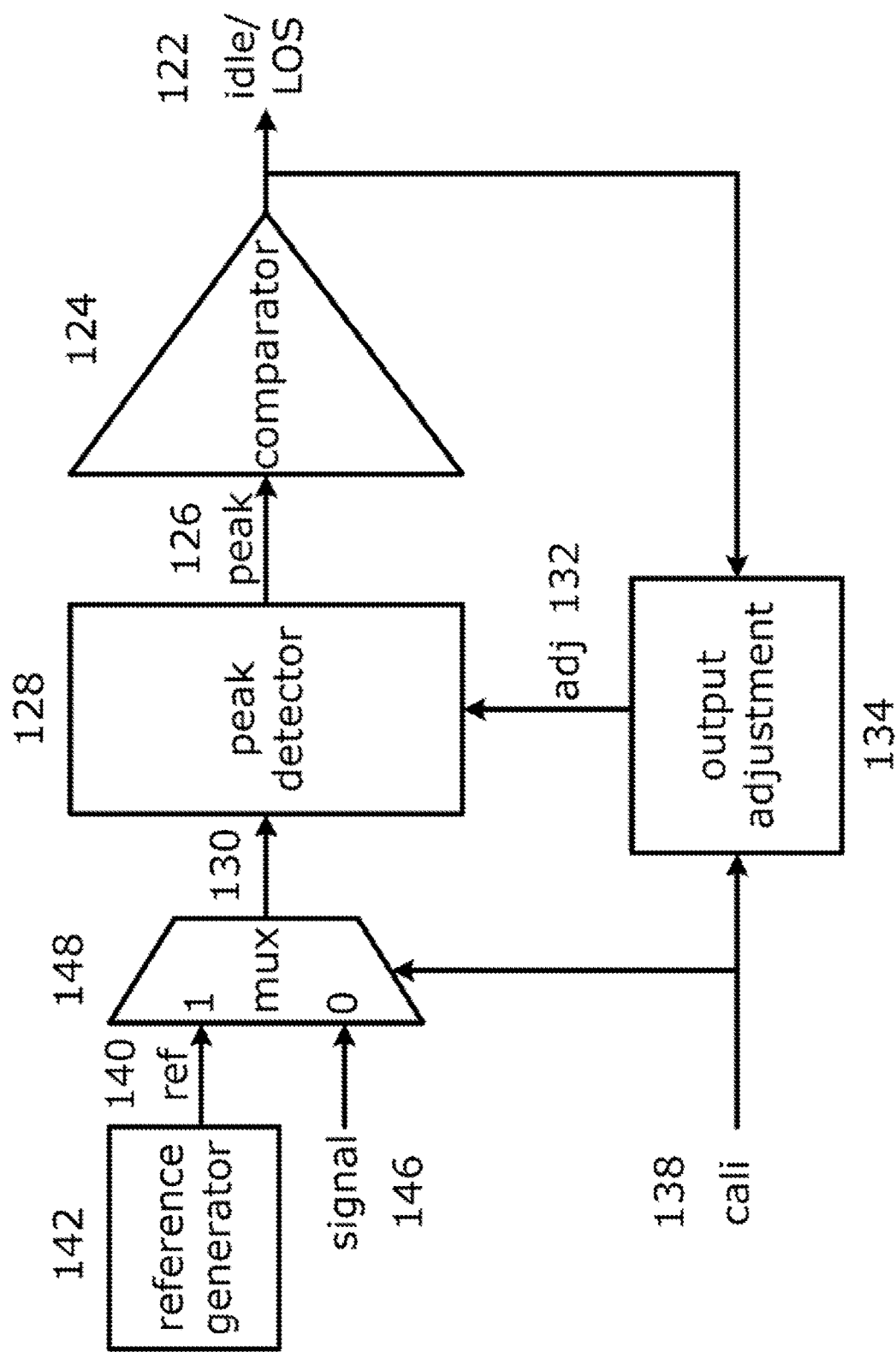
FIG. 1C illustrates a circuit that detects presence of signals, according to some embodiments of the present disclosure.

FIG. 1C illustrates a circuit (and method) that detects presence of signals (including but not limited to signals having a programmable voltage threshold), according to some embodiments of the present disclosure. In contrast to the existing circuits of FIGS. 1A-B, the circuit (and method) of FIG. 1C may detect an indication of the state of idle (and/or LOS) 122 based a comparison 124 involving one or more peak detector outputs 126 (which may include, but are not limited to, single-ended, differential or paired peak detector outputs, or any other peak detector outputs known to one skilled in the art), using a single peak detector 128.

As referred to herein, any signals herein may be single-ended or double-ended (i.e., known as differential, differential signals and/or differential pairs, including but not limited to having two opposite polarity signals paired together), and circuitry for converting between single-ended and double-ended, as well as circuitry for converting between double-ended and single-ended is understood to be applied, as known to one skilled in the art.

The circuit (and method) of FIG. 1C may generate one or more peak detector outputs 126 from a peak detector 128. The peak detector 128 may generate the outputs 126 based upon the output 130 of a multiplexer 148 (including but not limited to a preferred analog multiplexer, or any multiplexer known to one skilled in the art) and based upon output adjustment feedback 132 that the peak detector 128 receives from an output adjustment circuit 134 which receives the indication of the state of idle (and/or LOS) 122.

As illustrated in FIG. 1C, during a reference generation and calibration phase, a calibration input 138 may be set high, enabling the multiplexer 148 to forward 130 a reference signal 140 that is generated by a reference generator 142 to the peak detector 128 as part of the calibration process. As also illustrated in FIG. 1C, during a signal presence detection phase, a calibration input 138 may be set low, enabling the multiplexer 148 to forward 130 an input signal 146 to the peak detector 128 for signal presence detection.

As compared with existing systems of FIGS. 1A-B, embodiments herein are novel at least in that the reference generation may be incorporated into an offset calibration process which may be separated from the signal amplitude detection phase. As such, embodiments provide multiple advantages herein. Some advantages of embodiments of the present disclosure are that they save power, area, and are less sensitive to process, voltage, and/or temperature (PVT) variation.

According to some embodiments, and as illustrated in FIG. 1C, the reference generator 142 is preferably only needed during the calibration phase (when the calibration input 138 is set high), so the reference generator 142 may be powered down during the signal amplitude detection phase (when the calibration input 138 is low). Given that embodiments may mostly operate in the signal amplitude detection phase, powering down of the reference generator 142 is advantageous in that it provides a substantial savings in power.

In addition, peak detectors may be sensitive to process, voltage, and/or temperature (PVT) variation, as is common with sensitive analog circuits. To achieve a constant peak detector gain across PVT in deep submicron technology with a limited power and area budget may be challenging to achieve. As illustrated in the existing circuit of FIG. 1B, one previous solution is to use identical peak detectors 112 for each reference path (path from reference 104 to its corresponding peak detector output 110) and signal path (path from reference 102 to its corresponding peak detector output 110). However, this existing approach of FIG. 1B may be costly in area and/or power. Moreover, in deep submicron technology, it is may be challenging to obtain a good match (including but not limited to match of gain achieved) between two such peak detectors 112 of FIG. 1B. In contrast to the existing circuits of FIGS. 1A-B, and according to some embodiments and as illustrated in FIG. 1C, an accurate (and/or precise) gain of the peak detector 128 (including but not limited to a voltage gain from peak detector input 130 to peak detector output 126) is preferably not required. According to some embodiments, and as illustrated in FIG. 1C, since both the reference path (path which receives reference input 140) and signal path (path which receives signal 146) may share the same peak detector 128 in a time division multiplexing (TDM) fashion, both the reference voltage of the reference signal 140 and signal voltage of the input signal 146 may obtain the same amount of gain (the gain being provided across the peak detector 128) without the area and/or power penalty associated with the existing circuits of FIGS. 1A-B.

Figure 2:
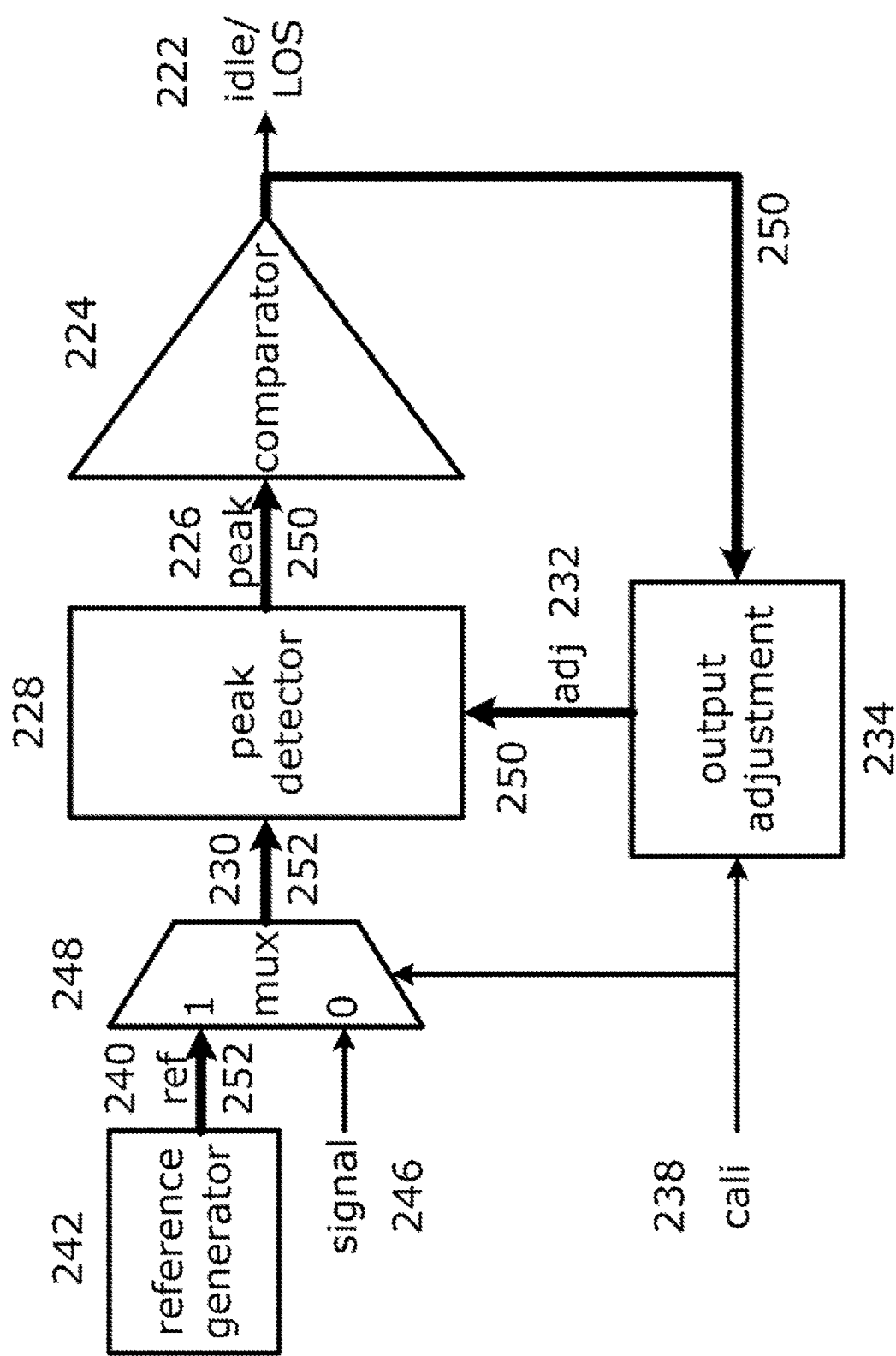
FIG. 2 illustrates a circuit and corresponding signal flow during the calibration and reference generation phase (Phase I), according to some embodiments of the present disclosure.
Figure 3:
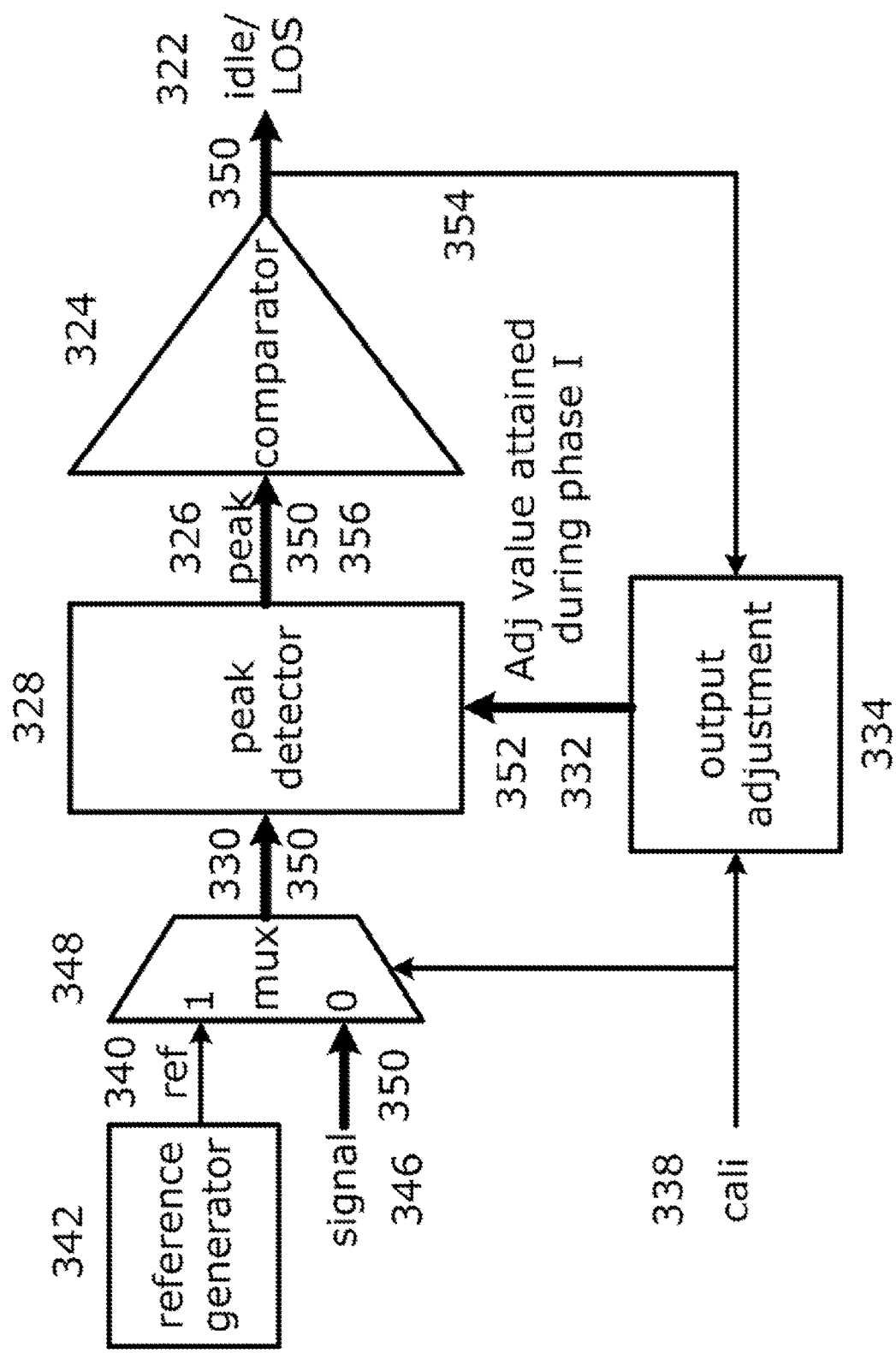
FIG. 3 illustrates a circuit and its corresponding signal flow during the signal amplitude detection phase (Phase II), according to some embodiments of the present disclosure.

Next, as illustrated in FIGS. 2-3 the detection circuit (and method) may include two phases: a calibration and reference generation phase (Phase I, shown in FIG. 2), and a signal amplitude detection phase (Phase II, shown in FIG. 3).

FIG. 2 illustrates a circuit and corresponding signal flow during the calibration and reference generation phase (Phase I), according to some embodiments of the present disclosure. According to some embodiments, during the calibration and reference generation phase (FIG. 2), the calibration input 238 is set high, enabling an analog multiplexer 248 to pass 230 the programmable reference voltage 240 (generated by a reference generator 242) through to the peak detector 228, instead of passing the input signal 246 to the peak detector 228. The output adjustment block 234 generates a signal, adj (232), to trim the peak detector output voltage (226) to 0 (a zero voltage value) by using the output information 222 of the comparator 224 through a feedback loop 250. According to some embodiments, not only is the reference voltage information 240 stored in the output adjustment block 234, but the offset of the peak detector output voltage 226 and the offset of the comparator input voltage offset 226 are also reduced. The degree to which the offset is trimmed is bounded by the output adjustment block's 234 trimming resolution.

According to some embodiments, the calibration path is illustrated in FIG. 2 by elements 250 (calibration) and 252 (reference generation and forwarding), collectively. According to some embodiments, a feedback loop of the calibration path is illustrated in FIG. 2 by the elements labeled 250.

FIG. 3 illustrates a circuit and its corresponding signal flow during the signal amplitude detection phase (Phase II), according to some embodiments of the present disclosure. According to some embodiments, and preferably after completion of the calibration and reference generation phase (FIG. 2), the signal amplitude detection phase may be utilized (FIG. 3). During the signal amplitude detection phase (FIG. 3), the value of the adj signal 332 is latched 334, and the input received signal 346 (referred to as "signal" in FIG. 3) is passed 330 to the peak detector 328 by the multiplexer 348 selecting the input received signal 346 instead of the reference signal 340 based upon the calibration input 338 being set low. According to some embodiments, if $V_{signal}$ (signal voltage swing of input signal 346) <$V_{ref}$ (voltage of reference signal 340), then $V_{peak}$ (voltage of peak output 326)<0, and idle=1 (high), indicating electrical idle and/or LOS (at the output 322 of the comparator 324), otherwise if $V_{signal}$ (signal voltage swing of input signal 346)>=$V_{ref}$ (voltage of reference signal 340), then $V_{peak}$ (voltage of peak output 326)>0, and idle=0 (low), indicating valid signal presence (at the output 322 of the comparator 324).

According to some embodiments, the signal detection path is illustrated in FIG. 3 by elements 350 and may include element 352. As also illustrated in FIG. 3, a feedback loop is not required to perform detection of an input signal 346. However, optionally, according to some embodiments, a feedback loop of the signal detection path is further illustrated in FIG. 3 by additional elements which may include elements 352, 354, and 356.

Figure 4:
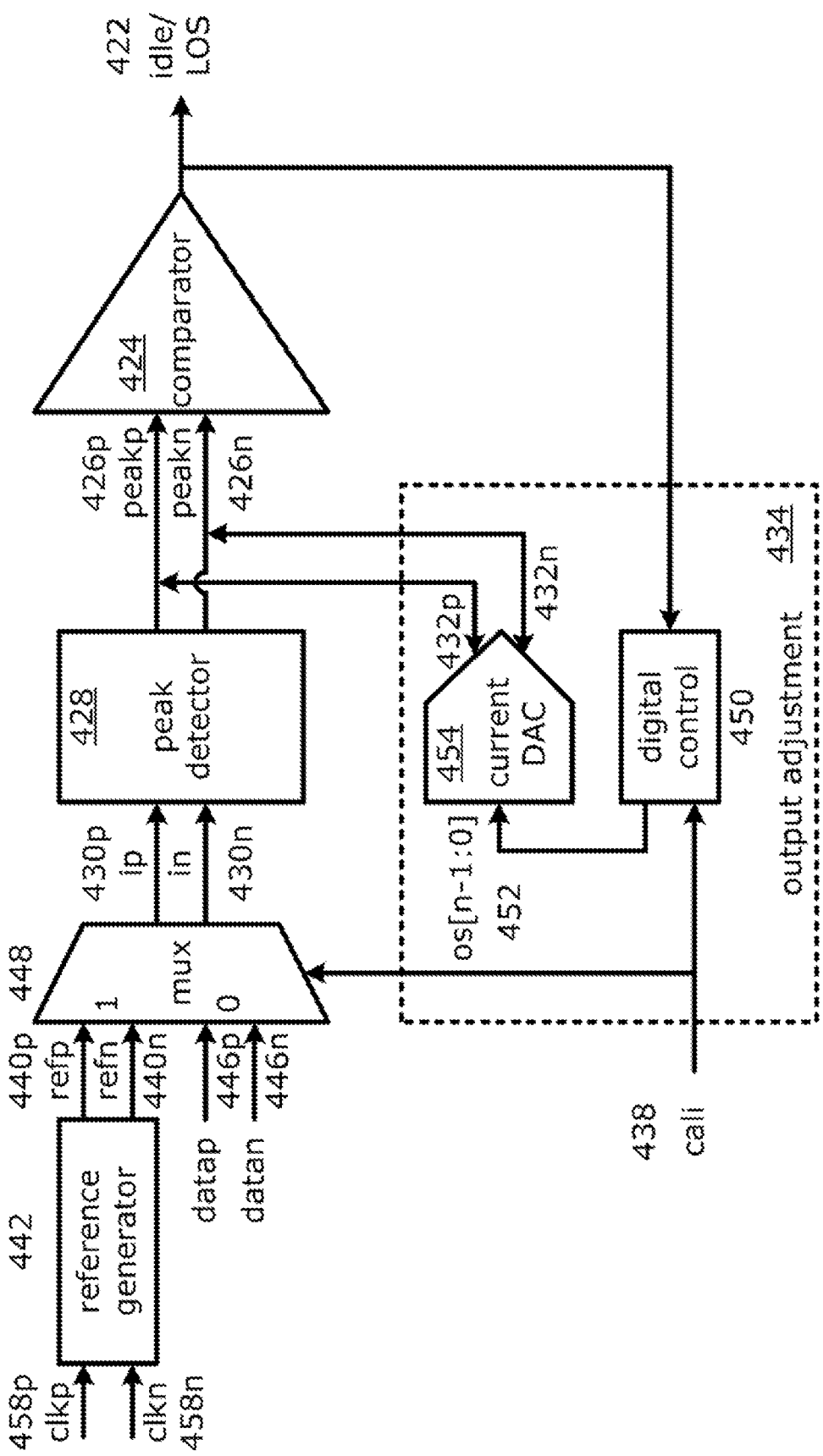
FIG. 4 illustrates a circuit that detects presence of differential signals, according to some embodiments of the present disclosure.

According to some embodiments, the circuits herein including but not limited to the circuits of FIG. 1C and FIGS. 2-4 may be implemented with single-ended signaling or differential signaling embodiments. However, differential signaling embodiments are preferred due to improved noise performance, as illustrated in FIG. 4.

Next, FIG. 4 illustrates a circuit that detects presence of differential input signals, according to some embodiments of the present disclosure. FIG. 4 also illustrates the circuitry within an output adjustment block 434 that may be optionally used (and/or modified by one skilled in the art to be used) in the output adjustment blocks 134, 234, 334, and 434 of the circuits of FIG. 1C, FIG. 2, FIG. 3, and FIG. 4, respectively, according to some embodiments of the present disclosure.

According to some embodiments, the circuit of FIG. 4 may perform a calibration and reference generation phase and/or a signal amplitude detection phase. During a calibration and reference generation phase, a reference differential pair 440p, 440n is generated by a reference generator 442 that receives an input clock differential pair 458p, 458n. The reference differential pair 440p, 440n is forwarded 430p, 430n by the multiplexer 448 to the peak detector 428 when the calibration input 438 is set high.

During the signal amplitude detection phase, the differential value of the adj signal (432p, 432n) is latched in the output adjustment circuit 434 (within elements 450 and/or 454) and output (elements 432p, 432n, respectively) to the peak detector 428. In addition, during the signal amplitude detection phase, the input received signal differential pair 446p, 446n is passed (430p, 430n) to the peak detector 428 by the multiplexer 448 that selects the input received signal differential pair 446p, 446n instead of the reference signal differential pair 440p, 440n based upon the calibration input 438 being set low. According to some embodiments, if $V_{signal}$ (signal voltage swing of input signal differential pair 446p, 446n)<\T$_{ref}$ (voltage of reference signal differential pair 440p, 440n), then V$_{peak}$ (voltage of peak output 426p, 426n)<0, and idle=1 (high), indicating electrical idle or LOS (at the output 422 of the comparator 424), otherwise if V$_{signal}$ (signal voltage swing of signal differential pair 446p, 446n)>=V$_{ref}$ (voltage of reference signal 440p, 440n), then V$_{peak}$ (voltage of peak output differential pair 426p, 426n)>0, and idle=0 (low), indicating valid signal presence (at the output 422 of the comparator 424).

According to some embodiments, the output adjustment 434 may use a current DAC 454 to adjust the peak detector output value 426p, 426n. The preferred embodiment of the current DAC 454 may switch sourcing and/or sinking current between peakp 426p and peakn 426n, so that the common mode voltage of peakp 426p and peakn 426n preferably remains constant over its digital settings (os[n–1:0], element 452).

Figure 5:
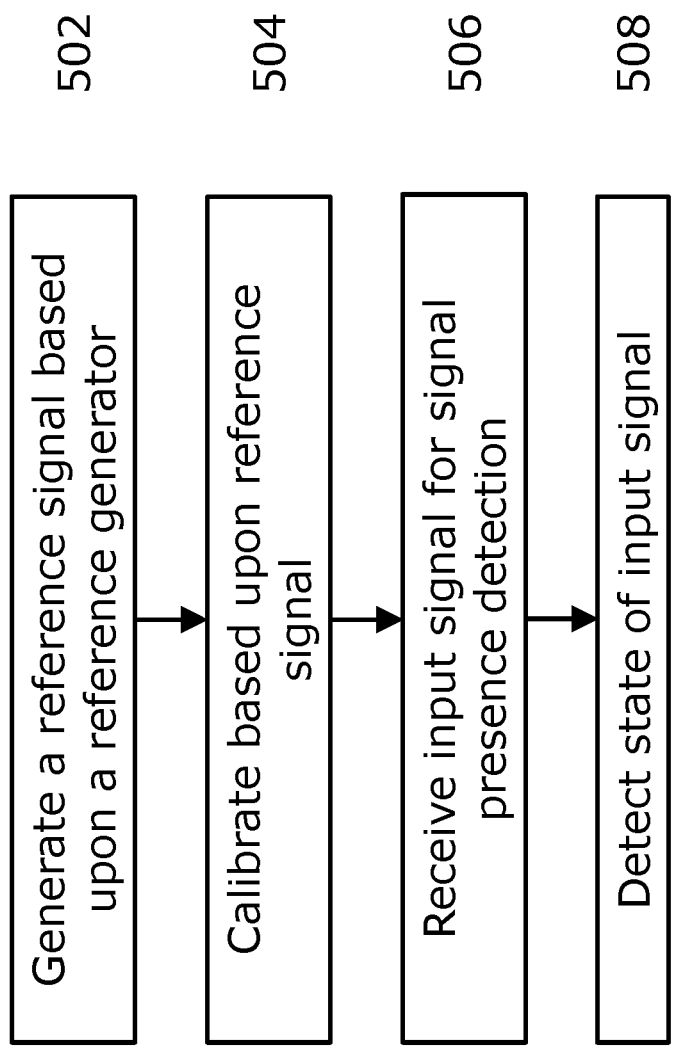
FIG. 5 illustrates a flowchart of an example method (or part of a circuit) that detects presence of signals, according to some embodiments of the present disclosure.

FIG. 5 illustrates a flowchart of an example method (or part of a circuit) that detects presence of signals, according to some embodiments of the present disclosure. In some embodiments, the methods (and circuits) may generate 502 a reference signal based upon a reference generator. In some embodiments, the methods (and circuits) may calibrate 504, during a calibration phase, a signal presence detection module (including but not limited to a signal presence detection circuit) based upon the reference signal. In some embodiments, the methods (and circuits) may receive 506, at a signal presence detection module, an input signal. In some embodiments, the methods (and circuits) may detect 508, during a signal amplitude detection phase, a state and/or indicator/indication of state (i.e., idle and/or LOS) of the input signal based upon the signal presence detection module. The calibration 504 and the detection 508 steps may share a peak detector of the signal presence detection module (i.e., the steps of calibration 504 and detection 508 may use the same peak detector).

According to some embodiments of the methods (and circuits), the reference generator may be unpowered during the signal amplitude detection phase. The calibrating and the detecting may share the peak detector based upon time division multiplexing. The peak detector may amplify the reference signal and the input signal based upon a gain. The reference signal may include at least one of: a direct-current (DC) value, a clock pattern, and a pseudo-random binary sequence (PRBS) pattern. The reference signal and the input signal may be differential signals.

According to some embodiments of the methods (and circuits), the signal presence detection module may select and forward to a multiplexer output the reference signal or the input signal. The signal presence detection module may detect, by the peak detector, at least one peak voltage associated with multiplexer output. The signal presence detection module may generate, by the peak detector, at least one peak detector output indicating at least one peak voltage based upon the detected at least one peak voltage. The signal presence detection module may perform, by a comparator, a comparison associated with the at least one peak detector output. The signal presence detection module may generate, by the comparator, a signal unavailability indication of at least one of idle and loss-of-signal based upon the state of the input signal.

According to some embodiments, the methods (and circuits) may amplify, by the peak detector, the multiplexer output based upon a gain, further generating the at least one peak detector output based upon the amplified multiplexer output. The signal presence detection module may include an output adjuster (i.e., output adjuster circuit) configured to adjust at least one peak detector output. The output adjuster may adjust the at least one peak detector output based upon the signal unavailability indication (i.e., idle and/or LOS).

According to some embodiments, the methods (and circuits) may, by a digital controller of the output adjuster, receive the signal unavailability indication and generate a control value. According to some embodiments, the methods (and circuits) may, by a digital-to-analog (DAC) converter of the output adjuster, adjust the peak detector output based upon the control value. The digital-to-analog (DAC) converter may source or sink a current between first and second differential outputs of the at least one peak detector output. The peak detector may provide a common mode voltage associated with the first and second differential (i.e., double-ended) outputs.

Figure 6:
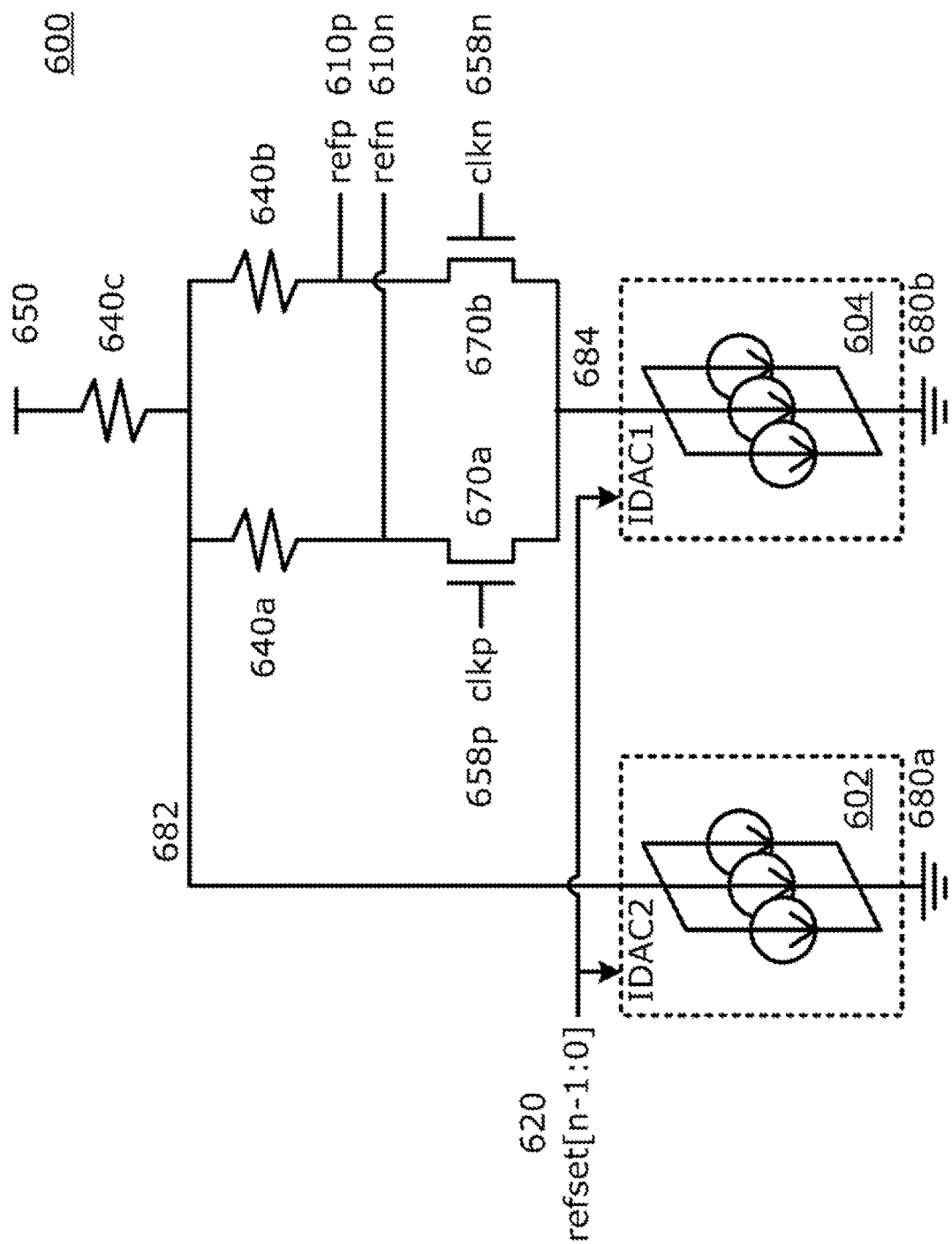
FIG. 6 illustrates a reference generator that may be used in the circuits of FIG. 1C and FIGS. 2-4 and in the method of FIG. 5, according to some embodiments of the present disclosure.

FIG. 6 illustrates a reference generator 600 that may be used as the reference generator 142, 242, 342, 442 of the circuits of FIG. 1C and FIGS. 2-4, respectively, and in step 502 of the method of FIG. 5, according to some embodiments of the present disclosure. The corresponding reference "ref" 610p, 610n (elements 140, 240, 340 of FIG. 1C, FIG. 2, FIG. 3, and collectively the elements 440p and 440n of FIG. 4) may have a direct-current (DC) or level value, a clock pattern, a pseudo-random binary sequence (PRBS) pattern, and/or any other voltage and/or data type known to one skilled in the art.

As illustrated in FIG. 6, the reference generator 600 may include transistors 670a and 670b. The transistors 670a and 670b may include but are not limited to including field-effect transistors (referred to as "FETs" herein), which may be n-Channel or p-Channel, or any other transistor known to one skilled in the art. As illustrated in a preferred embodiment of the reference generator 600 in FIG. 6, the reference generator 600 may be implemented as a current mode logic (CIVIL) circuit. The current digital-to-analog converter IDAC1 604 (connected to ground source 680b) may be connected 684 to ground source 680b and to the sources of transistors 670a, 670b. The current digital-to-analog converter IDAC1 604 may be used to change the voltage swing of the outputs "refp" 610p and/or "refn" 610n. The current digital-to-analog converter IDAC2 602 may be connected 682 to a resistor 640c that connects to power source 650. The current digital-to-analog converter IDAC2 602 may be used to compensate the common mode voltage change of refp, refn (610p, 610n, respectively) over digital settings (refset [n–1:0], element 620) that may be input and/or provided (to IDAC2 602 and IDAC 604) by circuitry, hardwiring (including but not limited to hardwiring of power or ground signals), and/or programmed in hardware (and/or computer-implemented software) in any manner known to one skilled in the art. As a result, the reference generator 600 may generate programmable differential reference signals refp, refn (610p, 610n, respectively) having constant common mode voltage across a tunable range. FIG. 6 also illustrates a differential input clock pair of "clkp" (658p) and "clkn" (658n), respectively that may be received on the gates of transistors 670a, 670b, respectively. The differential input clock pair of "clkp" (658p) and "clkn" (658n) may correspond to the clock differential pair inputs "clkp" (458p) and "clkn" (458n) of FIG. 4, respectively (and/or to respective clock inputs of reference generators 142, 242, 342, 442, of FIGS. 1C and 2-4, respectively, understood to exist by one skilled in the art, but not shown in FIGS. 1C and 2-4). FIG. 6 also illustrates that resistors 640a and 640b may connect to a resistor 640c that is connected to power source 650. The resistors 640a and 640b may also connect to the outputs refp" 610p and/or "refn" 610n, respectively, which may connect to the drains of transistors 670a, 670b, respectively.

Figure 7:
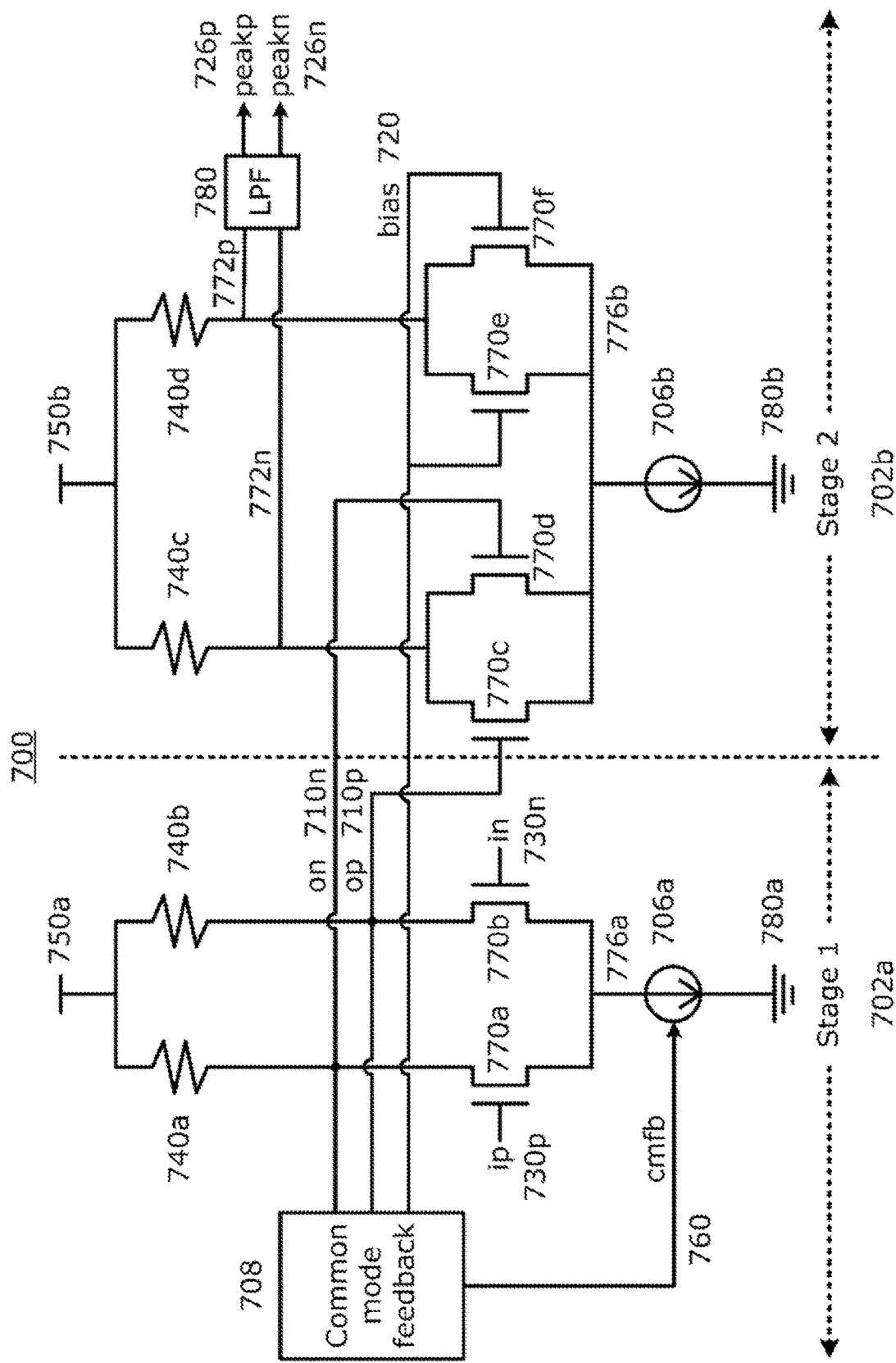
FIG. 7 illustrates a peak detector that may be used in the circuits of FIG. 1C and FIGS. 2-4 and in the method of FIG. 5, according to some embodiments of the present disclosure.

According to some embodiments, FIG. 7 shows the preferred embodiment of the peak detector 700. FIG. 7 illustrates a peak detector 700 that may be used as the peak detector 128, 228, 328, 428 of the circuits of FIG. 1C and FIGS. 2-4, respectively, and in steps 504 and 508 of the method of FIG. 5.

Also, according to some embodiments, the output differential pair 726p, 726n of the peak detector 700 of FIG. 7 may be used as the peak detector output differential pair 426p, 426n of the circuit of FIG. 4, and in steps 504 and 508 of the method of FIG. 5. As referred to herein, any signals herein may be single-ended or double-ended (i.e., known as differential, differential signals and/or differential pairs, including but not limited to having two opposite polarity signals paired together), and circuitry for converting between single-ended and double-ended (i.e., differential), as well as circuitry for converting between double-ended (i.e., differential) and single-ended is understood to be applied, as known to one skilled in the art. As such, the output differential pair 726p, 726n of the peak detector 700 of FIG. 7 may also be used as the peak detector output 126, 226, 326 of the circuits of FIG. 1C and FIGS. 2-4, respectively, according to some embodiments of the present disclosure.

Next, as illustrated in FIG. 7, the first stage 702a of the peak detector 700 may provide common mode rejection via a common mode feedback circuit 708. According to some embodiments, common mode rejection may be preferred for electrical idle (and/or LOS) detection for a variety of protocols, including but not limited to PCIe. The second stage 702b of the peak detector 700 is a rectifier which detects the envelope of the op/on differential pair (710p, 710n).

As illustrated in FIG. 7, the first stage 702a may include transistors 770a and 770b, and the second stage may include transistors 770c, 770d, 770e, and 770f. The transistors 770a, 770b, 770c, 770d, 770e, and 770f may include are but not limited to including field-effect transistors (referred to as "FETs" herein), which may be n-Channel or p-Channel, or any other transistor known to one skilled in the art.

As illustrated in FIG. 7, the first stage 702a may receive the peak detector inputs "ip" 730p and "in" 730n into the gates of transistors 770a, 770b, respectively. The peak detector inputs "ip" 730p and "in" 730n may correspond to the peak detector inputs "ip" 430p and "in" 430n of FIG. 4, and to the peak detector inputs 130, 230, 330 (which may be double-ended or differential, as described herein) of FIGS. 1C and 2-3, respectively. As illustrated in FIG. 7, the first stage 702a may generate and/or provide 708 common mode feedback 760 to a current source 706a that is connected to a ground source 780a. The current source 706a may connect 776a to the source of each of transistors 770a, 770b. As illustrated in FIG. 7, the drains of transistors 770a, 770b may connect to "on" 710n, "op" 710p, respectively, and may also connect to resistors 740a, 740b, respectively which connect to a power supply 750a. According to some embodiments, resistors 740a and 740b may share the same resistance value, but embodiments are not so limited.

As illustrated in the second stage 702b of FIG. 7, the gates of transistors 770c, 770d may receive "op" 710p, "on" 710n from the corresponding drains of transistors 770b, 770a, respectively. The gates of transistors 770e, 770f may receive a "bias" 720 which may be a constant or direct-current (DC) electrical value, but is not so limited. The "bias" 720 may be provided by circuitry, hardwiring (including but not limited to hardwiring of power or ground signals), and/or programmed in hardware (and/or computer-implemented software) in any manner known to one skilled in the art.

The sources of transistors 770c, 770d, 770e, 770f may connect 776b to a current source 706b that connects to ground 780b. The drains of transistors 770c, 770d may output a negative peak value 772n to a low pass filter (LPF, element 780) and may also output the negative peak value 772n to a resistor 740c that connects to a power source 750b. Similarly, the drains of transistors 770e, 770f may output a positive peak value 772p to a low pass filter (LPF, element 780) and may output the positive peak value 772p to a resistor 740d that connects to the power source 750b. The low pass filter (LPF, element 780) may filter the peak values 772p, 772n and output peak values 726p, 726n. According to some embodiments, resistors 740c and 740d may share the same resistance value, but embodiments are not so limited.

Referring to FIGS. 6-7 collectively, the power sources herein, including but not limited to 650, 750a, 750b, and the ground sources herein, including but not limited to 680a, 680b, 780a, 780b, may be implemented in any manner known to one skilled in the art.

Note that one of ordinary skill in the art appreciates that buffers and/or inverters, inverted inputs/output, and other circuit elements, may be added or removed from the circuits described herein, in order to modify the circuit functionality (data, clocks, or other circuitry) as needed for a given application. Therefore, some embodiments are not limited to the exact circuits shown herein and may be extended, while still relying upon the concepts of the some embodiments.

Some embodiments may be applied to any type of circuit, including, but not limited to, electronic circuits, semiconductors, integrated circuits, Very Large Scale Integrated Circuits (VLSI ICs), Application Specific Integrated Circuits (ASICs), circuitry on printed circuit boards (PCBs), nanotechnology circuits, and other types of circuits.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A circuit comprising:
   a reference generator configured to generate a reference signal;
   a signal presence detection circuit configured to perform calibration on itself, during a calibration phase, based upon the reference signal, the calibration determining an adjustment value; and
   the signal presence detection circuit further configured to, during a signal amplitude detection phase, 1) adjust an output signal based on the adjustment value, and 2) perform detection of a state of an input signal independent of a concurrent state of the reference signal, the signal amplitude detection phase and the calibration phase being temporally separate.

2. The circuit of claim 1, wherein the reference generator is unpowered during the signal amplitude detection phase.

3. The circuit of claim 1, wherein the signal presence detection circuit includes a peak detector which amplifies the reference signal and the input signal based upon a same gain.

4. The circuit of claim 1, wherein the signal presence detection circuit includes a peak detector which performs the calibration and the detection.

5. The circuit of claim 1, wherein the signal presence detection circuit includes a peak detector and the calibration and the detection share the peak detector based upon time division multiplexing.

6. The circuit of claim 1, wherein the reference signal and the input signal are differential signals.

7. The circuit of claim 1, wherein the signal presence detection circuit comprises:
   a multiplexer configured to select and forward to a multiplexer output the reference signal or the input signal;
   a peak detector configured to detect at least one peak voltage associated with the multiplexer output and generate at least one peak detector output indicating at least one peak voltage based upon the detected at least one peak voltage; and
   a comparator configured to perform a comparison associated with the at least one peak detector output;
   the comparator further configured to generate a signal unavailability indication of at least one of idle and loss-of-signal based upon the state of the input signal.

8. The circuit of claim 7, wherein the peak detector is further configured to amplify the multiplexer output based upon a gain and to generate the at least one peak detector output based upon the amplified multiplexer output, the signal presence detection circuit further comprising:
   an output adjuster configured to adjust the at least one peak detector output, based upon the signal unavailability indication.

9. The circuit of claim 8, wherein the output adjuster comprises:
   a digital controller configured to receive the signal unavailability indication and generate a control value; and
   a digital-to-analog converter (DAC) configured to adjust the at least one peak detector output based upon the control value.

10. The circuit of claim 9, wherein the DAC is further configured to perform at least one of sourcing and sinking of a current between first and second differential outputs of the at least one peak detector output, and the peak detector is further configured to provide a common mode voltage associated with the first and second differential outputs.

11. A method comprising:
   generating a reference signal based upon a reference generator;
   calibrating, during a calibration phase, a signal presence detection circuit based upon the reference signal to determine an adjustment value;
   adjusting, during a signal amplitude detection phase, an output signal based on the adjustment value; and
   detecting, during the signal amplitude detection phase, a state of an input signal based upon the signal presence detection circuit independent of a concurrent state of the reference signal, the signal amplitude detection phase and the calibration phase being temporally separate.

12. The method of claim 11, wherein the reference generator is unpowered during the signal amplitude detection phase.

13. The method of claim 11, wherein the reference signal and the input signal are amplified by a peak detector of the signal presence detection circuit based on a same gain.

14. The method of claim 11, wherein the calibrating and the detecting are performed by a peak detector of the signal presence detection circuit.

15. The method of claim 11, wherein the calibrating and the detecting share a peak detector of the signal presence detection circuit based upon time division multiplexing.

16. The method of claim 11, wherein the reference signal and the input signal are differential signals.

17. The method of claim 11, wherein the signal presence detection circuit performs the steps of:
   selecting and forwarding to a multiplexer output the reference signal or the input signal;
   detecting, by a peak detector, at least one peak voltage associated with the multiplexer output, and generating, by the peak detector, at least one peak detector output indicating at least one peak voltage based upon the detected at least one peak voltage;
   performing, by a comparator, a comparison associated with the at least one peak detector output; and
   generating, by the comparator, a signal unavailability indication of at least one of idle and loss-of-signal based upon the state of the input signal.

18. The method of claim 17, further comprising amplifying, by the peak detector, the multiplexer output based upon a gain, further generating the at least one peak detector output based upon the amplified multiplexer output, the method further comprising:
   adjusting the at least one peak detector output, by an output adjuster, based upon the signal unavailability indication.

19. The method of claim 18, further comprising:
   by a digital controller of the output adjuster, receiving the signal unavailability indication and generating a control value; and
   by a digital-to-analog converter (DAC) of the output adjuster, adjusting the at least one peak detector output based upon the control value.

20. The method of claim 19, further comprising performing, by the DAC, at least one of sourcing and sinking of a current between first and second differential outputs of the at least one peak detector output, and providing, by the peak detector, a common mode voltage associated with the first and second differential outputs.

* * * * *

UNITED STATES PATENT AND TRADEMARK OFFICE
CERTIFICATE OF CORRECTION

PATENT NO.       : 10,536,257 B2
APPLICATION NO.  : 16/281822
DATED            : January 14, 2020
INVENTOR(S)      : Wang et al.

Page 1 of 1

It is certified that error appears in the above-identified patent and that said Letters Patent is hereby corrected as shown below:

In the Specification

In Column 1, Line 7, delete "2017." and insert -- 2017, now Pat. No. 10,263,759. --, therefor.

In Column 7, Line 2, delete "<\Tref" and insert -- <Vref --, therefor.

In Column 8, Line 36, delete "(CIVIL)" and insert -- (CML) --, therefor.

In Column 8, Line 48, delete "IDAC 604)" and insert -- IDAC1 604) --, therefor.

Signed and Sealed this
Twenty-third Day of June, 2020

Andrei Iancu
*Director of the United States Patent and Trademark Office*